United States Patent
Han et al.

(10) Patent No.: US 10,364,329 B2
(45) Date of Patent: Jul. 30, 2019

(54) THERMOPLASTIC RESIN COMPOSITION AND MOLDED ARTICLE INCLUDING THE SAME

(71) Applicant: LG CHEM, LTD., Seoul (KR)

(72) Inventors: Seung Hun Han, Daejeon (KR); Dae San Jung, Daejeon (KR); Seong Lyong Kim, Daejeon (KR); Hyun Ho Joo, Daejeon (KR); Soo Kyeong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 22 days.

(21) Appl. No.: 15/534,971

(22) PCT Filed: Nov. 11, 2016

(86) PCT No.: PCT/KR2016/012972
§ 371 (c)(1),
(2) Date: Jun. 9, 2017

(87) PCT Pub. No.: WO2017/082661
PCT Pub. Date: May 18, 2017

(65) Prior Publication Data
US 2017/0342223 A1     Nov. 30, 2017

(30) Foreign Application Priority Data

Nov. 11, 2015 (KR) .................. 10-2015-0157893

(51) Int. Cl.
| | | |
|---|---|---|
| *C08J 5/00* | (2006.01) | |
| *C08L 25/10* | (2006.01) | |
| *C08L 25/12* | (2006.01) | |
| *C08L 71/02* | (2006.01) | |
| *C08L 25/16* | (2006.01) | |
| *C08L 33/20* | (2006.01) | |

(52) U.S. Cl.
CPC .................. *C08J 5/00* (2013.01); *C08L 25/10* (2013.01); *C08L 25/12* (2013.01); *C08L 25/16* (2013.01); *C08L 33/20* (2013.01); *C08L 71/02* (2013.01); *C08L 2205/03* (2013.01)

(58) Field of Classification Search
CPC .. C08J 5/00; C08L 25/10; C08L 25/12; C08L 25/16; C08L 71/02; C08L 2205/03
See application file for complete search history.

(56) References Cited

U.S. PATENT DOCUMENTS

| 4,634,732 A * | 1/1987 | Miller .................... C08L 35/06 |
| | | 524/504 |
| 5,741,854 A * | 4/1998 | Huang .................... C08K 5/06 |
| | | 525/178 |
| 6,228,920 B1 | 5/2001 | Topolkaraev et al. |
| 6,515,075 B1 | 2/2003 | Balogh et al. |
| 6,596,811 B1 | 7/2003 | Barghoorn et al. |
| 2003/0158335 A1* | 8/2003 | Guntherberg .......... C08K 5/005 |
| | | 525/92 D |
| 2003/0171472 A1 | 9/2003 | Seidel et al. |
| 2004/0054078 A1 | 3/2004 | Guntherberg et al. |
| 2008/0027182 A1 | 1/2008 | McNamara et al. |
| 2015/0240073 A1* | 8/2015 | Zhao ....................... C08L 69/00 |
| | | 524/313 |

FOREIGN PATENT DOCUMENTS

| CN | 1134957 A | 11/1996 |
| CN | 1303410 A | 7/2001 |
| CN | 1446244 A | 10/2003 |
| CN | 102884125 A | 1/2013 |
| EP | 0712895 A2 | 5/1996 |
| JP | H07-030230 A | 1/1995 |
| JP | 2002509970 A | 4/2002 |
| JP | 2003535182 A | 11/2003 |

OTHER PUBLICATIONS

Extended European Search Report for EP 16864587.7 dated Jul. 26, 2018.
International Search Report for International Patent Application No. PCT/KR2016/012972, filed Nov. 11, 2016.
Office Action from Chinese Patent Office for Application No. 201680004144.1 dated Sep. 21, 2018.

* cited by examiner

*Primary Examiner* — Robert S Jones

(57) ABSTRACT

The present invention relates to a thermoplastic resin composition. More particularly, the present invention relates a thermoplastic resin composition including 100 parts by weight of a base resin including (a) an aromatic vinyl compound-conjugated diene-based compound-vinyl cyan compound copolymer and (b) an aromatic vinyl compound-vinyl cyan compound copolymer; and (c) greater than 0.05 parts by weight and less than 11 parts by weight of a polyolefin oxide-based triblock copolymer, and a molded article including the same. In accordance with the present invention, the thermoplastic resin composition having superior chemical resistance and paintability with identical or superior impact strength, fluidity, and heat resistance, to conventional thermoplastic resin compositions, and a molded article including the same are provided.

12 Claims, No Drawings

THERMOPLASTIC RESIN COMPOSITION AND MOLDED ARTICLE INCLUDING THE SAME

CROSS-REFERENCE TO RELATED APPLICATIONS

This application is a U.S. National Stage of International Patent Application No. PCT/KR2016/012972, filed on Nov. 11, 2016, which claims the priority benefit of Korean Patent Application No. 10-2015-0157893, filed on Nov. 11, 2015 in the Korean Intellectual Property Office, the disclosures of which are incorporated herein by reference.

TECHNICAL FIELD

The present invention relates to a thermoplastic resin composition, more particularly a thermoplastic resin composition having superior chemical resistance and paintability with identical or superior impact strength, fluidity, and heat resistance, to conventional thermoplastic resin compositions, and a molded article including the same.

BACKGROUND ART

An acrylonitrile-butadiene-styrene (hereinafter referred to as ABS) resin is applied to various products, such as automobile appliances, electric and electronic products, and office equipment, due to stiffness and chemical resistance of acrylonitrile therein and processability, mechanical strength and beautiful appearance of butadiene and styrene therein.

Such an ABS resin is generally subjected to post-processing. As a representative post-processing step, there is a painting process. In this painting process, a chemical solvent, such as a thinner, is used to properly coat a paint on an ABS resin. However, when such a chemical solvent is used, the chemical solvent chemically attacks the ABS resin, whereby problems, such as crack generation in the ABS resin, may occur. In addition, such minute cracks eventually cause defects, such as pinholes and stains, in the paint.

Accordingly, methods, such as rubber content increase, rubber size increase, acrylonitrile content increase, and resin molecular weight increase, have been mainly used to reinforce chemical resistance against a chemical solvent. However, these methods eventually lower fluidity of an ABS resin, whereby residual stress of a molded article prior to painting increases. Accordingly, problems, such as pinhole generation in paint, are still present. Therefore, there is an urgent need for chemical resistance increase and paintability improvement of an ABS resin.

RELATED ART DOCUMENT

[Patent Document] (Patent Document 1) JP1995-030230 B2

DISCLOSURE

Technical Problem

Therefore, the present disclosure has been made in view of the above problems, and it is one object of the present disclosure to provide a thermoplastic resin composition having superior chemical resistance and paintability with identical or superior impact strength, fluidity, and heat resistance, to conventional thermoplastic resin compositions.

It is another object of the present disclosure to provide a molded article including the thermoplastic resin composition.

The above and other objects can be accomplished by the present disclosure described below.

Technical Solution

In accordance with one aspect of the present disclosure, provided is a thermoplastic resin composition, including: 100 parts by weight of a base resin including (a) an aromatic vinyl compound-conjugated diene-based compound-vinyl cyan compound copolymer and (b) an aromatic vinyl compound-vinyl cyan compound copolymer; and (c) greater than 0.05 parts by weight and less than 11 parts by weight of a polyolefin oxide-based triblock copolymer.

In accordance with another aspect of the present disclosure, provided is a molded article including the thermoplastic resin composition.

Advantageous Effects

As apparent from the fore-going, the present disclosure advantageously provides a thermoplastic resin composition having superior chemical resistance and paintability with identical or superior impact strength, fluidity, and heat resistance, to conventional thermoplastic resin compositions, and a molded article including the same.

Best Mode

Hereinafter, the present disclosure is described in detail.

The present inventors confirmed that, when a polyolefin oxide-based triblock copolymer is included in a predetermined amount in a thermoplastic resin composition, the thermoplastic resin composition exhibits increased chemical resistance and improved paintability, thus completing the present invention.

Hereinafter, the thermoplastic resin composition according to the present invention is described in detail.

The thermoplastic resin composition includes a thermoplastic resin composition, including: 100 parts by weight of a base resin including (a) an aromatic vinyl compound-conjugated diene-based compound-vinyl cyan compound copolymer and (b) an aromatic vinyl compound-vinyl cyan compound copolymer; and (c) greater than 0.05 parts by weight and less than 11 parts by weight of a polyolefin oxide-based triblock copolymer.

The conjugated diene-based compound of (a) the aromatic vinyl compound-conjugated diene-based compound-vinyl cyan compound copolymer is not specifically limited so long as it may be used in the polymerization. For example, the conjugated diene-based compound may be one or more selected from the group consisting of 1,3-butadiene, 2,3-dimethyl-1,3-butadiene, 2-ethyl-1,3-butadiene, 1,3-pentadiene, isoprene and derivatives thereof. Preferably, 1,3-butadiene is used as the conjugated diene-based compound. In this case, superior mechanical strength and property balance are provided.

The conjugated diene-based compound of (a) the aromatic vinyl compound-conjugated diene-based compound-vinyl cyan compound copolymer may be included in an amount of, for example, 40 to 80% by weight, 45 to 65% by weight, or 50 to 60% by weight with respect to (a) the aromatic vinyl compound-conjugated diene-based compound-vinyl cyan compound copolymer. Within this range, excellent mechanical properties are provided.

Each of the aromatic vinyl compounds of (a) the aromatic vinyl compound-conjugated diene-based compound-vinyl cyan compound copolymer and (b) the aromatic vinyl compound-vinyl cyan compound copolymer may be, for example, one or more selected from the group consisting of styrene, α-methylstyrene, p-methylstyrene, o-ethylstyrene, p-ethylstyrene, vinyltoluene, and derivatives thereof. Preferably, each of the aromatic vinyl compounds is styrene or α-methylstyrene. When styrene is used as the aromatic vinyl compound, superior impact strength, fluidity, and chemical resistance are provided. When α-methyl styrene is used as the aromatic vinyl compounds, excellent heat resistance is provided.

The aromatic vinyl compound included in (a) the aromatic vinyl compound-conjugated diene-based compound-vinyl cyan compound copolymer may be included in an amount of, for example, 10 to 40% by weight, 20 to 40% by weight, or 20 to 35% by weight with respect to (a) the aromatic vinyl compound-conjugated diene-based compound-vinyl cyan compound copolymer. Within this range, superior fluidity and property balance are provided.

The aromatic vinyl compound included in (b) the aromatic vinyl compound-vinyl cyan compound copolymer may be included in an amount of, for example, 10 to 90% by weight, 50 to 90% by weight, or 60 to 80% by weight with respect to (b) the aromatic vinyl compound-vinyl cyan compound copolymer. Within this range, superior mechanical properties and property balance are provided.

Each of the vinyl cyan compounds of (a) the aromatic vinyl compound-conjugated diene-based compound-vinyl cyan compound copolymer and (b) the aromatic vinyl compound-vinyl cyan compound copolymer may be, for example, one or more selected from the group consisting of acrylonitrile, methacrylonitrile, ethacrylonitrile, and derivatives thereof.

The vinyl cyan compound included in (a) the aromatic vinyl compound-conjugated diene-based compound-vinyl cyan compound copolymer may be included in an amount of, for example, 1 to 20% by weight, 5 to 20% by weight, or 5 to 15% by weight with respect to with respect to (b) the aromatic vinyl compound-vinyl cyan compound copolymer. Within this range, superior chemical resistance and heat resistance are provided.

The vinyl cyan compound included in (b) the aromatic vinyl compound-vinyl cyan compound copolymer may be included in an amount, for example, 10 to 90% by weight, 10 to 50% by weight, or 20 to 40% by weight with respect to (b) the aromatic vinyl compound-vinyl cyan compound copolymer. Within this range, superior mechanical properties and chemical resistance are provided.

(a) The aromatic vinyl compound-conjugated diene-based compound-vinyl cyan compound copolymer may be prepared, for example, through emulsion polymerization, bulk polymerization, solution polymerization or suspension polymerization. Preferably, (a) the aromatic vinyl compound-conjugated diene-based compound-vinyl cyan compound copolymer is prepared through emulsion polymerization. In this case, it is easy to control reaction, whereby desired molecular weight distribution may be accomplished.

(a) The aromatic vinyl compound-conjugated diene-based compound-vinyl cyan compound copolymer may be, for example, a graft copolymer prepared by graft-polymerizing a conjugated diene-based rubbery polymer including the conjugated diene-based compound with an aromatic vinyl compound and a vinyl cyan compound.

The conjugated diene-based rubbery polymer may have, for example, an average particle diameter of 50 to 500 nm, preferably 90 to 400 nm, more preferably 100 to 350 nm, most preferably 100 to 300 nm. Within this range, superior mechanical strength and property balance are provided.

In another embodiment, the conjugated diene-based rubbery polymer may be a mixture of a conjugated diene-based rubbery polymer (s) having an average particle diameter of 50 to 150 nm and a conjugated diene-based rubbery polymer (b) having an average particle diameter of greater than 150 nm and 500 nm or less. The conjugated diene-based rubbery polymer is preferably a mixture of a conjugated diene-based rubbery polymer (s) having an average particle diameter of 80 to 150 nm and a conjugated diene-based rubbery polymer (b) having an average particle diameter of greater than 150 nm and 400 nm or less, more preferably a mixture of a conjugated diene-based rubbery polymer (s) having an average particle diameter of 90 to 150 nm and a conjugated diene-based rubbery polymer (b) having an average particle diameter of 200 to 400 nm. Within this range, heat resistance in particular is superior.

A weight ratio (s:b) of the conjugated diene-based rubbery polymer (s) to the conjugated diene-based rubbery polymer (b) may be, for example, 1:0.5 to 1:1.5, 1:0.8 to 1:1.2, 1:0.8 to 1:1, or 1:0.8 or more and less than 1. Within this range, heat resistance in particular is superior.

In the present disclosure, an average particle diameter was measured by a dynamic laser light scattering method using a Nicomp 370HPL instrument (manufactured by Nicomp, US).

(a) The aromatic vinyl compound-conjugated diene-based compound-vinyl cyan compound copolymer may be included, for example, in an amount of 10 to 50% by weight, 15 to 35% by weight, or 20% by weight or more and less than 35% by weight with respect to the base resin. Within this range, superior impact strength and fluidity are provided.

(b) The aromatic vinyl compound-vinyl cyan compound copolymer may be included, for example, in an amount of 50 to 90% by weight, 65 to 85% by weight, or greater than 64% by weight and 80% by weight or less with respect to the base resin. Within this range, superior mechanical properties and property balance are provided.

(c) The polyolefin oxide-based triblock copolymer may be, for example, a polyethylene oxide-polypropylene oxide triblock copolymer. In this case, the chemical solvent is prevented from penetrating into a resin, thereby providing superior chemical resistance.

The polyethylene oxide-polypropylene oxide triblock copolymer may be represented by, for example, Formula 1 or 2 below;

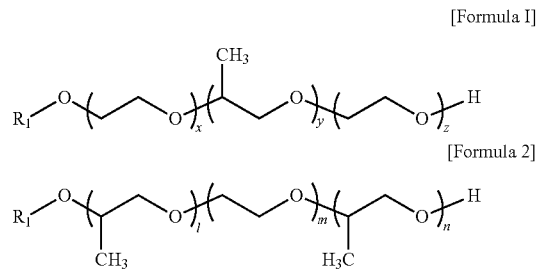

In Formulas 1 and 2, R1 and R2 are each independently hydrogen, an alkyl group having a carbon number of 1 to 30, a cycloalkyl group having a carbon number of 5 to 30, an aryl group having a carbon number of 6 to 30, or an alkylaryl group having a carbon number of 6 to 30, and x, y, z, 1, m, and n are each independently an integer of 1 to 200.

R1 and R2 may be, for example, hydrogen, and x, y, z, 1, m, and n may be each independently, for example, an integer of 1 to 150, or 1 to 100.

The polyethylene oxide may be included, for example, in an amount of 10 to 85% by weight, or 10 to 80% by weight, 20 to 80% by weight, 30 to 80% by weight, 45 to 80% by weight, 60 to 80% by weight, or 70 to 80% by weight with respect to the polyolefin oxide-based triblock copolymer. Within this range, superior chemical resistance and paintability are provided.

The polypropylene oxide may have a number average molecular weight (Mn), for example, 1,000 to 15,000 g/mol, 4,000 to 13,000 g/mol, 5,000 to 12,000 g/mol, or 8,000 to 10,000 g/mol. Within this range, superior heat resistance, chemical resistance, and paintability are provided.

The polyolefin oxide-based triblock copolymer may have a number average molecular weight (Mn) of, for example, 1,500 to 20,000 g/mol, 1,500 to 18,000 g/mol, or 1,500 to 5,000 g/mol. Within this range, superior heat resistance, chemical resistance, and paintability are provided.

In the present disclosure, a number average molecular weight may be measured by GPC analysis.

The polyolefin oxide-based triblock copolymer may be included in an amount of, for example, greater than 0.05 parts by weight and less than 11 parts by weight, 0.1 to 10 parts by weight, or 1 to 5 parts by weight with respect to the thermoplastic resin composition. Within this range, superior heat resistance, chemical resistance, and paintability are provided.

The thermoplastic resin composition may have, for example, a chemical resistance of greater than 300 sec, 330 sec or more, or 330 to 600 sec. Within this range, superior chemical resistance against a chemical solvent is provided, whereby pinholes are not generated during painting.

The thermoplastic resin composition might not exhibit pinholes, for example, after a paintability test (drying in an 85° C. oven).

A molded article according to the present invention includes the thermoplastic resin composition.

The molded article may be, for example, an injection-molded article. Particularly, the molded article may be an automobile interior material or an automobile exterior material.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

100 parts by weight of a base resin, which included 27% by weight of an ABS graft copolymer (product name: DP270, manufactured by LG Chemical), in which the average particle diameter of butadiene rubber was 300 nm, and 73% by weight of an AMSAN copolymer (product name: 100UH, manufactured by LG Chemical); and 1 part by weight of a polyethylene oxide-polypropylene oxide triblock copolymer (1), in which the number average molecular weight of the polypropylene oxide was 1,750 g/mol and the polyethylene oxide was included in a content of 80% by weight, were fed into an extruder, followed by melting and kneading at 250° C. As a result, a pellet-type resin composition was prepared. The prepared pellet-type resin composition was injected to produce a specimen for property measurement.

Example 2

An experiment was carried out in the same manner as in Example 1, except that the polyethylene oxide-polypropylene oxide triblock copolymer (1) was added in an amount of 2 parts by weight.

Example 3

An experiment was carried out in the same manner as in Example 1, except that the polyethylene oxide-polypropylene oxide triblock copolymer (1) was added in an amount of 5 parts by weight.

Example 4

An experiment was carried out in the same manner as in Example 1, except that a base resin including 30% by weight of an ABS graft copolymer and 70% by weight of an AMSAN copolymer was used.

Example 5

100 parts by weight of a base resin, which included 30% by weight of an ABS graft copolymer (product name: DP270, manufactured by LG Chemical) and 70% by weight of an SAN copolymer (product name: 92HR, manufactured by LG Chemical); and 1 part by weight of a polyethylene oxide-polypropylene oxide triblock copolymer (1), in which the number average molecular weight of the polypropylene oxide was 1,750 g/mol and the polyethylene oxide was included in a content of 80% by weight, were fed into an extruder, followed by melting and kneading at 250° C. As a result, a pellet-type resin composition was prepared. The prepared pellet-type resin composition was injected to produce a specimen for property measurement.

Example 6

An experiment was carried out in the same manner as in Example 5, except that a base resin including 25% by weight of an ABS graft copolymer and 75% by weight of an SAN copolymer was used.

Example 7

100 parts by weight of a base resin, which included 14% by weight of an ABS graft copolymer (product name: DP270, manufactured by LG Chemical), in which the average particle diameter of butadiene rubber was 300 nm, 13% by weight of an ABS graft copolymer (manufactured by LG Chemical), in which the average particle diameter of butadiene rubber was 100 nm, and 73% by weight of an AMSAN copolymer (product name: 100UH, manufactured by LG Chemical); and 1 part by weight of a polyethylene oxide-polypropylene oxide triblock copolymer (1), in which the number average molecular weight of the polypropylene oxide was 1,750 g/mol and the polyethylene oxide was included in a content of 80% by weight, were fed into an extruder, followed by melting and kneading at 250° C. As a result, a pellet-type resin composition was prepared. The prepared pellet-type resin composition was injected to produce a specimen for property measurement.

Example 8

An experiment was carried out in the same manner as in Example 1, except that the polyethylene oxide-polypropylene oxide triblock copolymer (1) was added in an amount of 0.5 parts by weight.

Example 9

100 parts by weight of a base resin, which included 27% by weight of an ABS graft copolymer (product name: DP270, manufactured by LG Chemical), 50% by weight of an AMSAN copolymer (product name: 100UH, manufactured by LG Chemical), and 23% by weight of an SAN copolymer (product name: 92HR, manufactured by LG Chemical); and 0.5 parts by weight of a polyethylene oxide-polypropylene oxide triblock copolymer (1), in which the number average molecular weight of the polypropylene oxide was 1,750 g/mol and the polyethylene oxide was included in a content of 80% by weight, were fed into an extruder, followed by melting and kneading at 250° C. As a result, a pellet-type resin composition was prepared. The prepared pellet-type resin composition was injected to produce a specimen for property measurement.

Comparative Example 1

An experiment was carried out in the same manner as in Example 1, except that the polyethylene oxide-polypropylene oxide triblock copolymer was not added.

Comparative Example 2

An experiment was carried out in the same manner as in Example 1, except that the polyethylene oxide-polypropylene oxide triblock copolymer was added in an amount of 0.01 parts by weight.

Comparative Example 3

An experiment was carried out in the same manner as in Example 1, except that the polyethylene oxide-polypropylene oxide triblock copolymer was added in an amount of 0.05 parts by weight.

Comparative Example 4

An experiment was carried out in the same manner as in Example 1, except that the polyethylene oxide-polypropylene oxide triblock copolymer was added in an amount of 11 parts by weight.

Comparative Example 5

An experiment was carried out in the same manner as in Comparative Example 1, except that the ABS graft copolymer was added in an amount of 35% by weight instead of the amount of 27% by weight, and the AMSAN copolymer was added in an amount of 65% by weight instead of the amount of 73% by weight.

Comparative Example 6

An experiment was carried out in the same manner as in Example 5, except that the polyethylene oxide-polypropylene oxide triblock copolymer was not added.

TEST EXAMPLES

The properties of the thermoplastic resin composition specimen obtained according to each of Examples 1 to 9 and Comparative Examples 1 to 6 were measured according to the following methods. Results are summarized in Table 1 below.

Measurement Methods

Impact strength (Notched Izod Impact Strength, kgf·cm/cm): Measured according to a standard measurement method, ASTM D256, using a specimen having a thickness of 6.4 mm.

Fluidity (MI, g/10 min): Measured according to a standard measurement method, ASTM D1238, (under conditions of 220° C. and 10 kg) using a specimen.

Heat deflection temperature (HDT, ° C.): Measured according to ASTM D648 (under a condition of 18.6 kgf/cm$^2$) using a specimen having a thickness of 6.35 mm.

Chemical resistance: A specimen having a length of 200 mm, a width of 12.7 mm, and a thickness of 3.2 mm was fixed to a curvature jig having a strain of 1.7%, and 200 µl of a thinner was spread on the specimen. Subsequently, a time (sec) at which cracks occurred on the specimen was measured.

Paintability: A specimen having a length of 10 cm and a width of 10 cm was degreased using isopropyl alcohol. Subsequently, a black paint (product name: UT578(A), manufactured by KCC) was sprayed onto the specimen and, five minutes later, a clear paint (product name: UT5015-A, manufactured by KCC) was sprayed onto the specimen. Subsequently, the specimen was dried for 30 minutes in an 85° C. oven, and then generation of pinholes in a painted surface was observed. The case in which pinholes were not generated was represented as "○", the case in which one to five pinholes were generated at corners of a specimen was represented as "Δ", and the case in which six or more pinholes were generated at corners of a specimen was represented as "x".

TABLE 1

| Classification | | Examples | | | | | | | | |
|---|---|---|---|---|---|---|---|---|---|---|
| | | 1 | 2 | 3 | 4 | 5 | 6 | 7 | 8 | 9 |
| ABS | Rubber particle diameter: 300 nm | 27 | 27 | 27 | 30 | 30 | 25 | 14 | 27 | 27 |

TABLE 1-continued

| Classification | 1 | 2 | 3 | 4 | 5 | 6 | 7 | 8 | 9 |
|---|---|---|---|---|---|---|---|---|---|
| Rubber particle diameter: 100 nm | | | | | | | 13 | | |
| AMSAN | 73 | 73 | 73 | 70 | — | — | 73 | 73 | 50 |
| SAN | — | — | — | — | 70 | 75 | — | — | 23 |
| Triblock copolymer | 1 | 2 | 5 | 1 | 1 | 1 | 1 | 0.5 | 0.5 |
| Impact strength | 22.0 | 21.7 | 20.5 | 25.4 | 26.8 | 22.0 | 17.5 | 21.3 | 23.5 |
| Fluidity | 7 | 7.1 | 7.4 | 6 | 12.0 | 14.0 | 6.5 | 7.0 | 10.0 |
| Heat deflection temperature | 101.6 | 101.3 | 100.8 | 99.0 | 90.5 | 92.0 | 102.5 | 101.7 | 96.0 |
| Chemical resistance | 350 | 500 | 600 | 450 | 550 | 500 | 400 | 300 | 500 |
| Paintability | ○ | ○ | ○ | ○ | ○ | ○ | ○ | ○ | ○ |

TABLE 2

| Classification | 1 | 2 | 3 | 4 | 5 | 6 |
|---|---|---|---|---|---|---|
| ABS | 27 | 27 | 27 | 27 | 35 | 30 |
| AMSAN | 73 | 73 | 73 | 73 | 65 | — |
| SAN | — | — | — | — | — | 70 |
| Triblock copolymer | — | 0.01 | 0.05 | 11 | — | — |
| Impact strength | 22.0 | 22.3 | 22.0 | 17.5 | 27.0 | 27.0 |
| Fluidity | 7.0 | 7.0 | 7.0 | 7.9 | 6.0 | 11.8 |
| Heat deflection temperature | 101.7 | 101.5 | 101.6 | 99.5 | 98.0 | 90.8 |
| Chemical resistance | 18 | 20 | 50 | 300 | 200 | 250 |
| Paintability | x | x | x | Δ | x | x |

As summarized in Table 1, it can be confirmed that, in the cases of the specimens of Example 1 to 4 prepared according to the present invention, all of impact strength, fluidity, and heat deflection temperature are superior, chemical resistance is excellent, and pinholes are not generated in the painted surfaces. In addition, it can be confirmed that, in the cases of the specimens of Examples 5 and 6 including the SAN copolymer instead of the heat-resistant AMSAN copolymer, chemical resistance is remarkably improved and pinholes are not generated in the painted surfaces.

In addition, it can be confirmed that, in the case of the specimen of Example 7 in which the ABS graft copolymer having a small particle size was applied, heat deflection temperature is superior. Further, it can be confirmed that, in the case of the specimen of Example 9 in which general SAN and AMSAN resins were used together, superior chemical resistance, impact strength, and fluidity are exhibited despite application of a small amount of triblock copolymer.

On the other hand, it can be confirmed that, in the cases of the specimen of Comparative Example 1, in which the polyethylene oxide-polypropylene oxide triblock copolymer was not added, and Comparative Examples 2 and 3, in which the polyethylene oxide-polypropylene oxide triblock copolymer was added in a small amount, chemical resistance is very poor and a large number of pinholes is formed. In addition, it can be confirmed that, in the case of the specimen of Comparative Example 4 in which the polyethylene oxide-polypropylene oxide triblock copolymer was added in a large amount, all of impact strength, heat deflection temperature, chemical resistance, and paintability are decreased.

Further, it can be confirmed that, in the case of the specimen of Comparative Example 5, in which a rubber content is increased instead of addition of the polyethylene oxide-polypropylene oxide triblock copolymer, fluidity and heat deflection temperature are decreased, chemical resistance is poor, and a large number of pinholes is formed.

In addition, it can be confirmed that, in the case of the specimen of Comparative Example 6 in which an SAN copolymer is included instead of the heat-resistant AMSAN copolymer and the polyethylene oxide-polypropylene oxide triblock copolymer is not included, overall properties are decreased and paintability is very poor.

REFERENCE EXAMPLES

Reference Example 1

An experiment was carried out in the same manner as in Example 1, except that a polyethylene oxide-polypropylene oxide triblock copolymer in which the number average molecular weight of polypropylene oxide was 850 g/mol and a polyethylene oxide content was 10% by weight was added, in the same amount, instead of the polyethylene oxide-polypropylene oxide triblock copolymer in which the number average molecular weight of polypropylene oxide was 1,750 g/mol and a polyethylene oxide content was 80% by weight. As a result, an impact strength of 22.1 kgf·cm/cm, a fluidity of 7.4 g/10 min, a heat deflection temperature of 100.0° C., a chemical resistance of 40 sec, and paintability of Δ were observed.

Reference Example 2

An experiment was carried out in the same manner as in Example 1, except that a polyethylene oxide-polypropylene oxide triblock copolymer (2), in which a polyethylene oxide content was 20% and a number average molecular weight was 3,440, was added instead of the polyethylene oxide-polypropylene oxide triblock copolymer. As a result, an impact strength of 22.3 kgf·cm/cm, a fluidity of 7.4 g/10 min, a heat deflection temperature of 101.5° C., a chemical resistance of 45 sec, and a paintability of X were observed.

From the results of Reference Examples 1 and 2, it can be confirmed that the number average molecular weight of the polypropylene oxide and the polyethylene oxide content considerably affect the properties of the thermoplastic resin composition of the present disclosure.

In conclusion, the present inventors confirmed that, when a polyolefin oxide-based triblock copolymer is included in a predetermined content to prepare a thermoplastic resin composition, identical or superior impact strength, fluidity, and heat resistance, compared to conventional thermoplastic resin compositions, are provided and chemical resistance against a chemical solvent used during painting is superior, whereby pinholes are not generated during painting. Accordingly, the present inventors confirmed that a thermoplastic resin composition providing superior paintability, and a molded article including the same may be realized.

The invention claimed is:

1. A thermoplastic resin composition, comprising: 100 parts by weight of a base resin comprising (a) an aromatic vinyl compound-conjugated diene-based compound-vinyl cyan compound copolymer and (b) an aromatic vinyl compound-vinyl cyan compound copolymer comprising α-methylstyrene; and (c) between 0.5 parts by weight and 5 parts by weight of a polyethylene oxide-polypropylene oxide triblock copolymer,
wherein (a) the aromatic vinyl compound-conjugated diene-based compound-vinyl cyan compound copolymer is comprised in an amount of 10% by weight to 50% by weight with respect to the base resin,
wherein (b) the aromatic vinyl compound-vinyl cyan compound copolymer is comprised in an amount of 50% by weight to 90% by weight with respect to the base resin, and
wherein a number average molecular weight (Mn) of the polypropylene oxide is 1,000 to 1,750 g/mol.

2. The thermoplastic resin composition according to claim 1, wherein (a) the aromatic vinyl compound-conjugated diene-based compound-vinyl cyan compound copolymer is a graft copolymer prepared by graft-polymerizing a conjugated diene-based rubbery polymer comprising the conjugated diene-based compound with an aromatic vinyl compound and a vinyl cyan compound.

3. The thermoplastic resin composition according to claim 1, wherein the conjugated diene-based compound of (a) the aromatic vinyl compound-conjugated diene-based compound-vinyl cyan compound copolymer is one or more selected from the group consisting of 1,3-butadiene, 2,3-dimethyl-1,3-butadiene, 2-ethyl-1,3-butadiene, 1,3-pentadiene, isoprene, and derivatives thereof.

4. The thermoplastic resin composition according to claim 1, wherein the aromatic vinyl compounds of (a) the aromatic vinyl compound-conjugated diene-based compound-vinyl cyan compound copolymer is one or more selected from the group consisting of styrene, α-methylstyrene, p-methylstyrene, o-ethylstyrene, p-ethylstyrene, and derivatives thereof.

5. The thermoplastic resin composition according to claim 1, wherein the vinyl cyan compounds of (a) the aromatic vinyl compound-conjugated diene-based compound-vinyl cyan compound copolymer is one or more selected from the group consisting of acrylonitrile, methacrylonitrile, ethacrylonitrile, and derivatives thereof.

6. The thermoplastic resin composition according to claim 1, wherein the polyethylene oxide is comprised in an amount of 10 to 85% by weight with respect to (c) the triblock copolymer.

7. The thermoplastic resin composition according to claim 1, wherein a number average molecular weight (Mn) of the polypropylene oxide is 1,000 to 15,000 g/mol.

8. The thermoplastic resin composition according to claim 1, wherein a number average molecular weight (Mn) of (c) the triblock copolymer is 1,500 to 20,000 g/mol.

9. The thermoplastic resin composition according to claim 1, wherein the thermoplastic resin composition has a chemical resistance of greater than 300 sec.

10. The thermoplastic resin composition according to claim 1, wherein the thermoplastic resin composition does not exhibit pinholes after a paintability test (drying in an 85° C. oven).

11. A molded article, comprising the thermoplastic resin composition according to claim 1.

12. A molded article, comprising the thermoplastic resin composition according to claim 9.

* * * * *